(12) United States Patent
Belflower et al.

(10) Patent No.: US 7,918,629 B2
(45) Date of Patent: Apr. 5, 2011

(54) EZ KEY REGISTRATION ASSEMBLY

(75) Inventors: Joseph F. Belflower, Rocky Mount, NC (US); Kermit Lawson, Tarboro, NC (US); Gary E. Morehart, Rocky Mount, NC (US); Doug G. Davis, Rocky Mount, NC (US)

(73) Assignee: Kaba Iko Corp., Rocky Mount, NC (US)

( * ) Notice: Subject to any disclaimer, the term of this patent is extended or adjusted under 35 U.S.C. 154(b) by 1018 days.

(21) Appl. No.: 11/724,473

(22) Filed: Mar. 15, 2007

(65) Prior Publication Data
US 2008/0226408 A1 Sep. 18, 2008

(51) Int. Cl.
*B23C 3/35* (2006.01)

(52) U.S. Cl. ........... 409/131; 409/81; 269/268; 269/270

(58) Field of Classification Search .......... 409/131–132, 409/81–83; 269/43, 258, 268, 270, 265, 269/257; 76/110; *B23C 3/35*
See application file for complete search history.

(56) References Cited

U.S. PATENT DOCUMENTS

| | | | | | |
|---|---|---|---|---|---|
| 2,282,165 | A | * | 5/1942 | Corson | 409/81 |
| 3,094,039 | A | * | 6/1963 | Spain | 409/82 |
| 4,852,866 | A | * | 8/1989 | Kristoff | 269/87.2 |
| 5,167,171 | A | | 12/1992 | Heredia | |
| 5,314,272 | A | | 5/1994 | Kubota | |
| 5,443,339 | A | * | 8/1995 | Heredia et al. | 409/81 |
| 5,906,365 | A | * | 5/1999 | Wu | 269/43 |
| 6,152,435 | A | * | 11/2000 | Snell | 269/43 |
| 2002/0141843 | A1 | * | 10/2002 | Mueller et al. | 409/132 |

FOREIGN PATENT DOCUMENTS

IT 1195639 B * 10/1988
WO WO-2005/085567 A1 * 9/2005

OTHER PUBLICATIONS

Kaba Ilco dual function machine "029A" as shown at www.kaba.ilco.com/key_systems/products/key_machines/029A.asp.
Kaba Ilco "Card Type" machanical code machine "Universal II" as shown at www.kaba.ilco.com/key_systems/products/key_machines/Universal_II.asp.
Kaba Ilco "Ultracode" electronic code-cutting machine shown at www.kaba.ilco.com/key_systems/products/key_machines/code_machines....
Keyosk dual purpose key cutting machine shown on their website at www.keyosk.co.uk.
Keycutting Machines "KCM 24G" as shown on their website at www.keycuttingmachines.com/KCM24G.

* cited by examiner

*Primary Examiner* — Erica E Cadugan
(74) *Attorney, Agent, or Firm* — Dennis A. Gross; The Hill Firm

(57) ABSTRACT

A locating system and method for accurately positioning key blanks with respect to a key cutter where the key head is clamped between opposing jaws with the key blade working edges projecting therefrom, the key head is provided with shaped recesses having at least a partially specifically shaped edge wall and wherein at least one jaw member is provided with a projection having a correspondingly shaped sidewall, the pin being positioned with respect to the clamp such that when the key blank head is abutted against the pin with the key blank edge configuration mating to the pin sidewall configuration, the key blade will project from the jaw in a proper position for engagement by either the bitting follower or bitting cutter respectively.

5 Claims, 5 Drawing Sheets

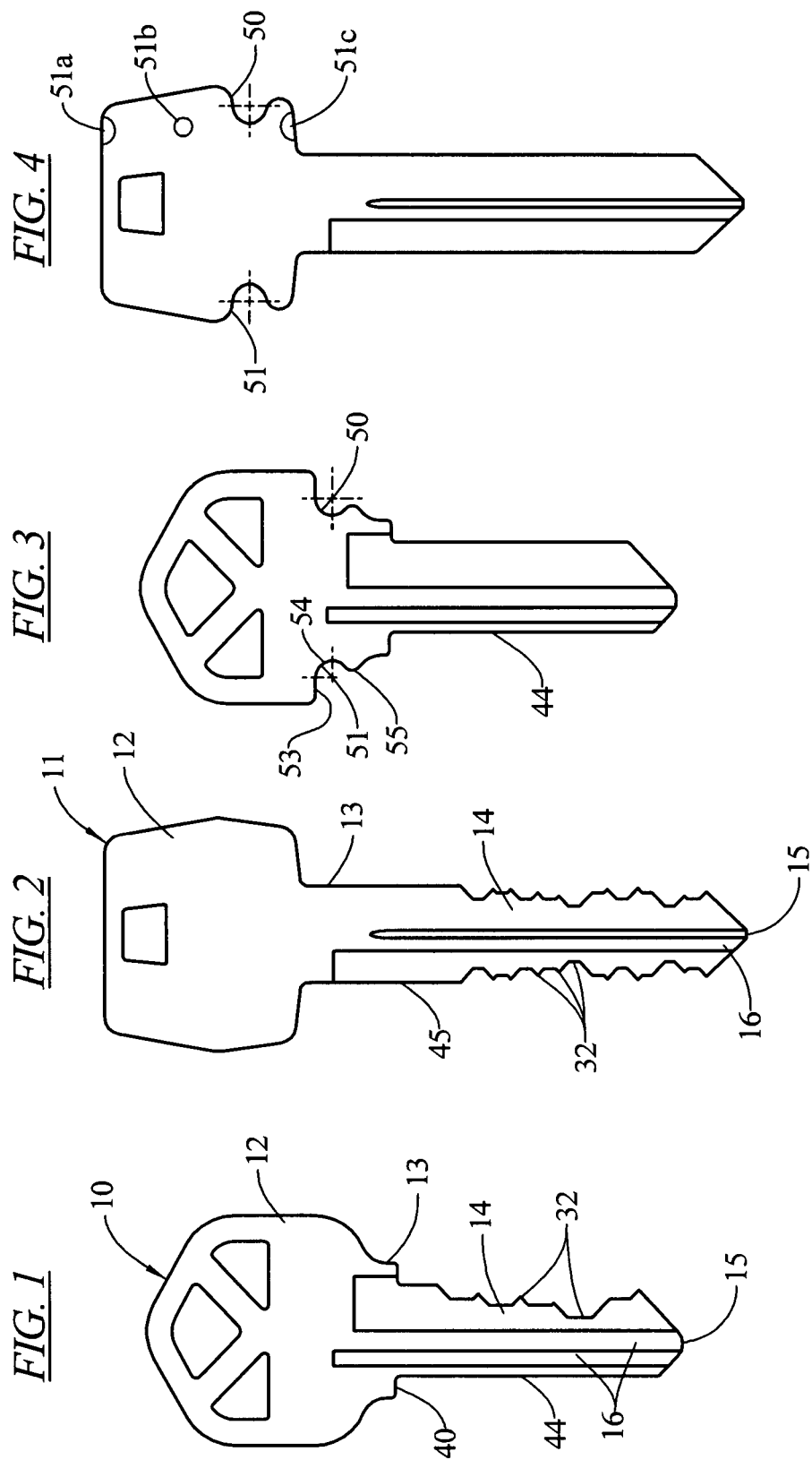

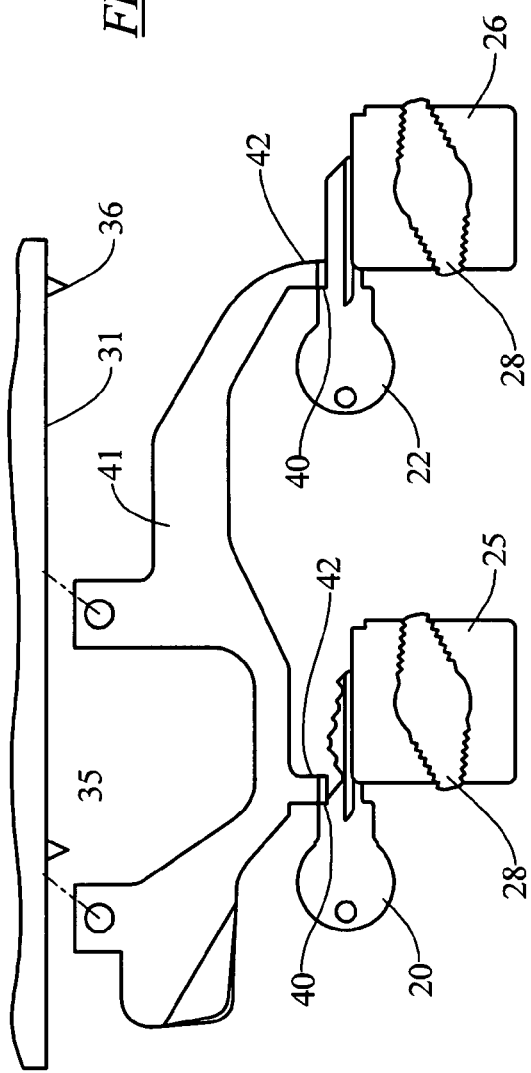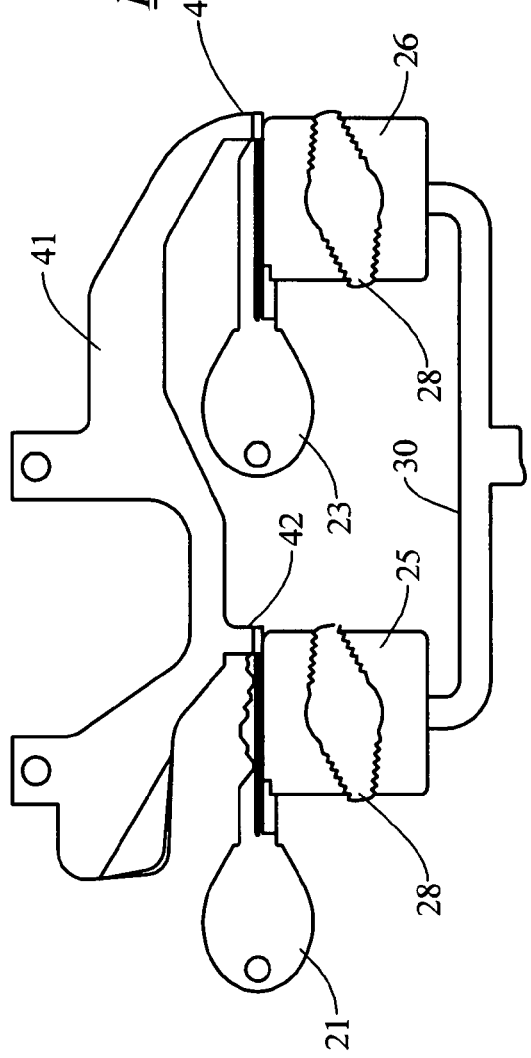

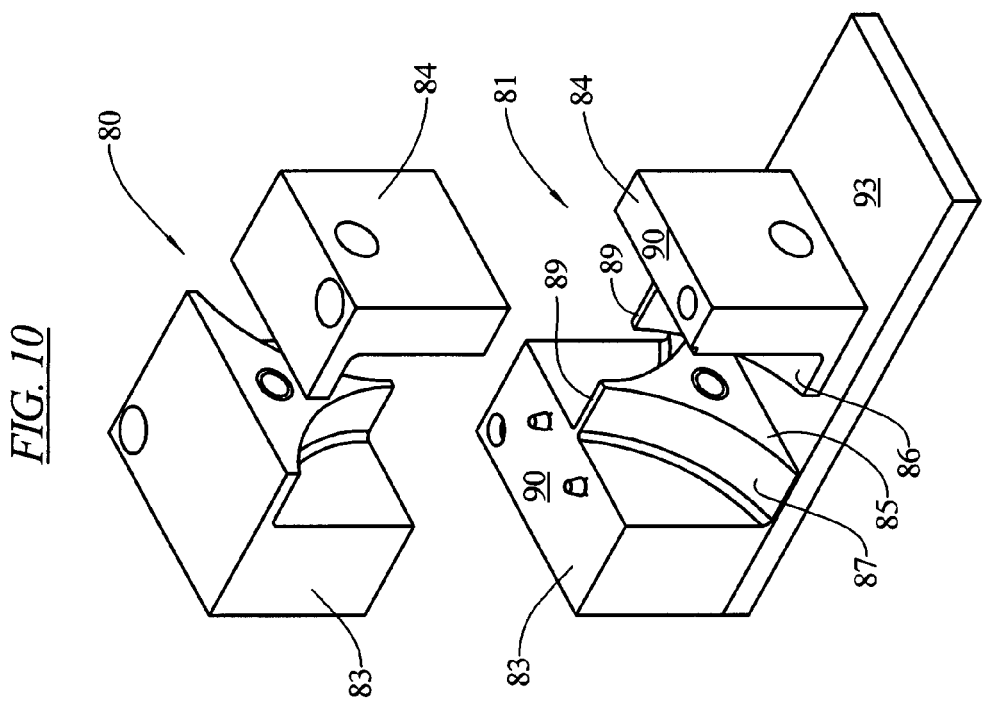
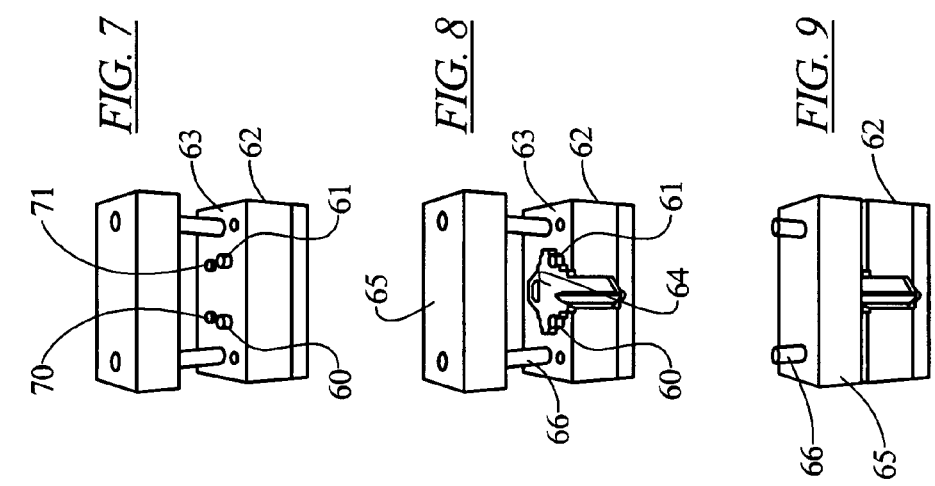

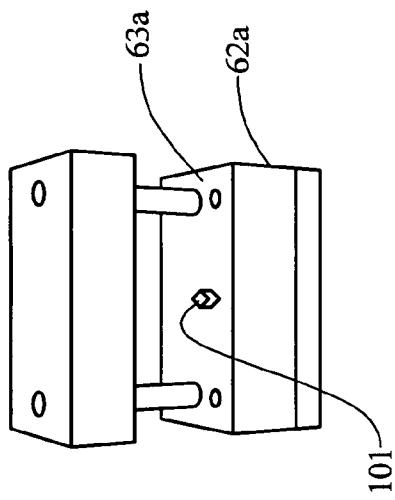
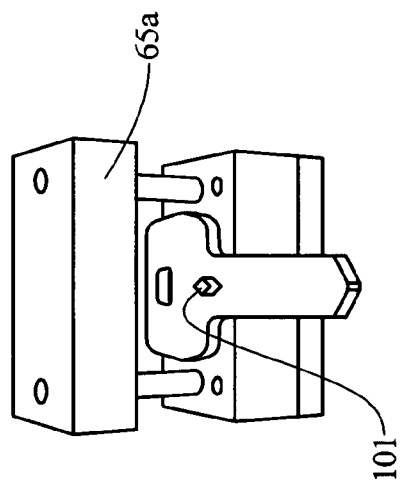
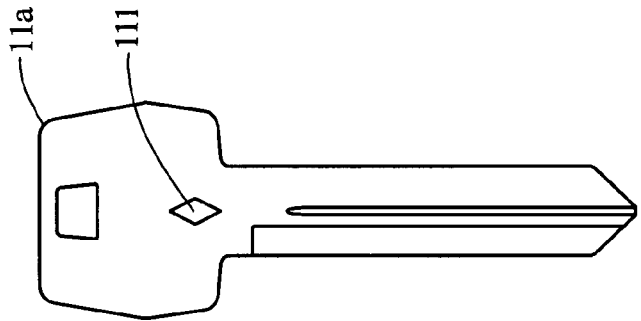
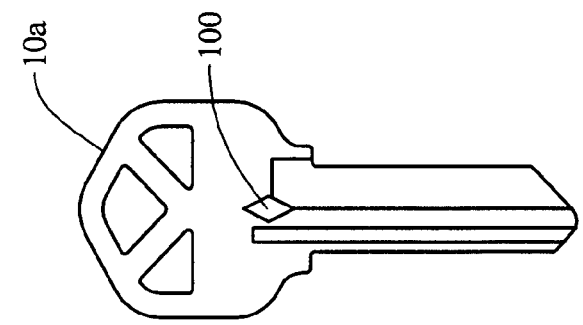
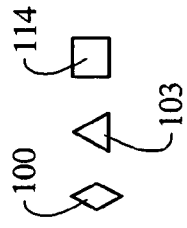

EZ KEY REGISTRATION ASSEMBLY

FIELD OF THE INVENTION

This invention relates to keys, and more particularly to a key cutter and key head configuration utilizing projecting clamp pins and key head wall configurations mating with the pins for properly positioning the key in the jaw clamp and to methods of aligning keys in key cutting machines.

BACKGROUND OF THE INVENTION

Edge bitted key blanks are normally cut by cutting machines which preposition the key blank in a jawed clamp or vise. The positioning holds the edge of the key blade which is to be cut for bitting a fixed position relative to a clamped original key.

Most often the keys are positioned with respect to either the tip end of the blade or to a shoulder at the head end of the blade since bitting measurements along the length of the blade are normally specified as having their positions at specified distances from one of those two base points, i.e. either the blade tip or the blade shoulder. Precise positioning of the key edge is critical to the proper cutting of the bitting. In the most commonly used standard key cutting machines, a moveable vise supporting carriage is provided having spaced apart vise jaws, one for the original key and one for the uncut key blank. With the two keys properly positioned between the jaws of each vise, the two jaws are moved in unison with the cut key being moved both inwardly against a fixed follower and axially along the length of the blade so that the vises move with respect to the follower both inwardly and outwardly as the carriage is moved axially to move the original key along its length against the follower.

A cutting wheel is spaced from the follower a distance equal to the spacing between the original key vise and key blank vise. Since the original key clamp vise and the key blank clamp vise are fixed for movement together, the key blank edge will be urged against the rotating cutter both inwardly and outwardly and in direct proportion to the movement of the cut original key against the follower. In such standard cutting machines the keys normally lie in the same plane and are axially aligned their longitudinal axis from head to tip with the follower spaced to one side of the machine and the cutting blade spaced to the other side of the machine, both open to a front. The clamping vises are received at the top of a yolk-shaped carriage, which is pivotally attached towards a base of the machine and may be moved manually or automatically.

In other key cutting machines, the key to be cut may be clamped between clamping jaws that engage the head end of the key with the blade of the key projecting outwardly from the clamping jaws. Again, the positioning of the key head is generally either based upon an abutment of the key tip with a fixed abutment spaced from the head clamp or by an abutment of the key shoulder against a fixed point. In some such machines the cutter blade may move along the length of the key blade and may move inwardly and outwardly with respect to the center line of the key blade, normally following a profile determined from a corresponding bitted edge of the original key while in other machines the key moves with respect to the cutter. While various proposals have been made for determining the profile of the bitted edge of the original key, the most common solution is the use of an edge follower which is positionally fixed either mechanically or electronically to the cutting device, usually a wheel. While various other suggestions, including laser cutting and the like have been made, it is common to key cutting machines to fixedly position the key to be cut in a clamped position where its blade's position with respect to the cutting modality is determined, at least in part, with reference to either the tip of the key or a shoulder of the key or both. It is also known to cut both sides of a key blade at the same time for keys having identical bitting on each edge. For example, as shown in U.S. Pat. No. 5,443,339, which also teaches that the shoulder may be cut at the same time on an unshouldered key blank.

Unfortunately experience has shown that these prior systems often result in miscut keys. This is almost always due to a mispositioning of either the original key or of the key blank in its clamp vise. Since both the original key vise and the key blank vise are in fixed relationship to one another on the carriage, any misalignment between either key and its properly seated position in its vise will cause the resultant key cut from the key blank to have a different bit profile than the original since as the carriage is moved inwardly and outwardly and laterally of the follower, with the follower always in contact with the bitted edge of the original key, the movement of the key carried in the key blank jaws will be identical to the movement of the original key, and since the cutter wheel cutting edge is aligned with the key engaging point of the follower, the inevitable result of any mispositioning of either one or both of the keys in its associated vise clamp is that the bitted edge profiles will not match after cutting, with the likely result that the newly cut key will not operate in the lock and will need to be discarded.

While it is known to use key cutting machines in which the keys are held in vises connected to a pivotal and laterally moveable carriage, with the key blade or blade and head received between the jaws of the clamp such that a single working edge of the key extends from the clamp, other clamping methods are also known where the key instead of being moved laterally across the front of the key cutting machine would be moved longitudinally with the key blade projecting into the cutting machine. In such machines the key blade may be simultaneously or sequentially cut on both sides as the clamping mechanism is applied to areas of the key, generally the head, other than the bitted or working edges. Oftentimes keys are provided with a shank extending between the head and the bitted edge, which begins at or includes a shoulder, and clamping can be made at the head, the shank, the tip or centrally of the blade along its length since bit cutting normally does not reach to the center line of the blade. It is, however, common in known clamping systems, whether they clamp at the blade, head, shank, or combinations thereof, that mispositioning between the clamped position of the original key and the clamped position of the key blank to be cut is a common problem.

It would therefore be an advance in the art to provide a locating system for positioning the keys, both the original bitted key and the key blank, in the clamp vises that minimizes the possibility of misalignment or mispositioning of the keys with respect to the vises.

SUMMARY OF THE INVENTION

This invention provides for proper positioning of the key with respect to the vise by providing inter-fitting indexing features on a jaw and on the key. These indexing features prevent the key from being mispositioned with respect to the jaw such that when the jaws are tightened towards each other and the keys are clamped in position, there can be no mispositioning between the original key and the key blank.

In an embodiment of the invention at least one of the jaws of each of the vises is provided with at least one projecting shaped surface feature and the key head and/or shank is provided with a opening or recess configured to closely receive the jaw projection.

In an embodiment of the invention the key is clamped at its head end and has the key blade projecting from the clamp jaw, at least one clamping face of a clamping jaw is provided with a key engaging surface which includes one or more surface interruptions which are indexable with corresponding mating surface features on the key head and/or shank such that when the surface features of the jaw face and the mating features of the key are in juxtaposition to one another, the key will be in a singular position with respect to the jaw.

In an embodiment of the invention the key blank is provided with two indentations in opposite side edges of the key head and at least one clamp jaw of each clamp assembly is provided with projecting pins with the recess's edge walls and the pins outer surface having complimentary shapes, the pins and recesses being spaced apart substantially equidistant whereby the head can be received at least partially between the pins with the pins nestled in the recesses.

In an embodiment of the invention a portion of the key, either the head, the shank or some other portion of the key blank which will be received between the jaws of the clamp vise assembly is provided with at least one partially walled opening therein having a unique configuration and the vise jaw face on which the key is to be positioned has a correspondingly shaped projection, which when inter-fitted with the opening positions the key in only one or two predetermined positions with respect to the jaw.

In an embodiment of the invention the key head is provided with one or more triangular, square, rectangular, diamond or other shaped openings and each vise has a jaw surface which is provided with a similar shaped projecting pin or surface raised projections dimensioned to be snuggly received in the opening.

The vise may be a standard two-jaw vise having relatively moveable opposed jaws which can be biased towards one another to trap a key therebetween with the pins or other surface interruptions being formed on only one jaw face, in which case the pins will have a dimension above the main surface of the jaw face which is equal to or less than the thickness of the portion of the key which the pin will mate with, or, alternatively, in such a vise the opposing jaw may be provided with a feature or a recess adapted to receive a portion of the surface feature of the opposed jaw upon completion of clamping when the pins have a length greater than the key thickness.

Alternatively, each vise jaw may consist of a pair of spaced apart jaw portions, which each engage opposite end portions of the key and which have an opening therebetween providing access to the working edge or edges of the key. By forming the vise jaws as spaced apart jaw portions, the key can be supported at its head end and at its tip end while being securely clamped in position. This double clamping of the key at both the head and tip end can have the advantageous effect of reducing cutting vibration in the key blade during cutting.

It is therefore an object of this invention to provide a less error-prone method and apparatus for securing keys in key cutting machines.

It is a further object of this invention to provide an improved method and apparatus for properly positioning keys in a key cutting apparatus to minimize misalignment between the bitted key and the key blank to be bitted.

These and other objects and features of the invention will become apparent from a description of the preferred embodiments described herein, which illustrate and represent only selected ways in which the invention may be carried out.

BRIEF DESCRIPTION OF THE DRAWINGS

FIGS. 1 and 2 represent existing prior art keys with FIG. 1 showing a key which is bitted on one edge of the blade and FIG. 2 illustrating a key which is bitted on opposite side edges of the blade.

FIGS. 3 and 4 are key blanks from which keys similar to the keys of FIGS. 1 and 2 may be bitted, the key blanks being equipped with locating features for placement in a key cutting machine.

FIG. 5 is a diagrammatic view of portions of a key cutting machine illustrating alignment of an original bitted key and a key blank with reference to a shoulder.

FIG. 6 is a view similar to FIG. 5 showing alignment of an original key and a key blank with reference to the key tip.

FIG. 7 is a diagrammatic illustration of a vise jaw consisting of a pair of opposed jaws, the lower one being equipped with surface interruptions in the form of projecting pins for receipt of a key head.

FIG. 8 is a view similar to FIG. 7 showing the key received in position.

FIG. 9 is a view similar to FIGS. 7 and 8 showing the jaws of the vise clamped about the key.

FIG. 10 is an alternative embodiment of a vise consisting of upper and lower jaws, the jaws each consisting of two portions set spaced from one another and at least one top face of a lower jaw portion being provided with surface interruptions.

FIGS. 13 and 14 show key blanks similar to FIGS. 3 and 4 with an alternative embodiment of the locating feature formed as a diamond shaped opening through the key head.

FIG. 15 illustrates varying shapes for openings and corresponding pin shapes usable in the embodiment of FIGS. 13 and 14.

FIG. 16 is a view of a vise similar to FIG. 7 where the lower jaw is provided with a surface interruption to index with the opening of the keys of FIGS. 13 and 14.

FIG. 17 is a view similar to FIG. 8 showing the key in position on the vise on the lower jaw.

DESCRIPTION OF THE PREFERRED EMBODIMENT

Figure 12:
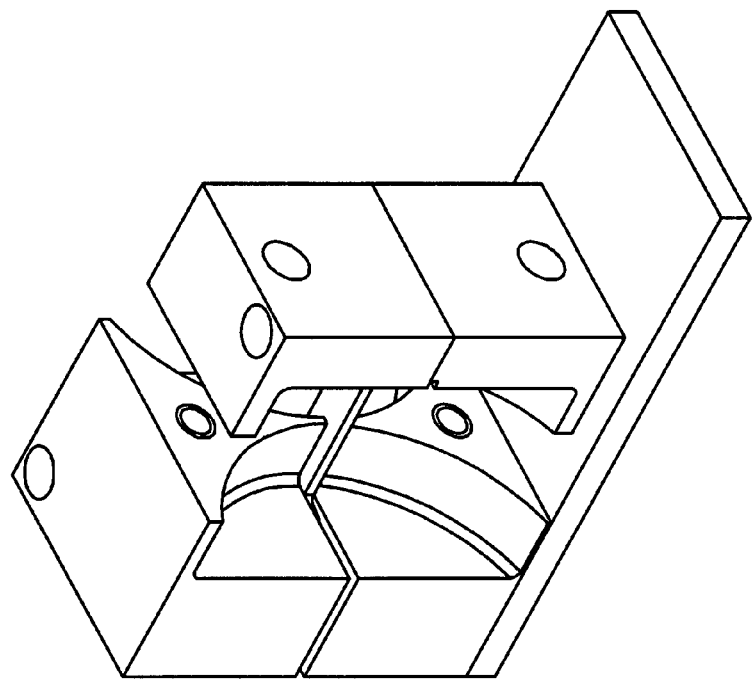
FIG. 12 illustrates the alternative vise assembly with the jaws in position clamping the key for cutting.

Shown in FIGS. 1 and 2 a key 10 or 11 may generally be described as having a head portion 12, a shank portion 13, a blade 14, and a tip 15. The blade portion may be provided with grooves, raised ribs, or other wards 16 that inter-fit with corresponding ward configurations in the key slot of the lock. As is well known, the features 16 are usually formed by milling or stamping subsequent during manufacture of the key blank.

As is illustrated in FIGS. 5 and 6, when it is desired to duplicate an existing key 20 or 21, a key blank 22, 23 is provided that has the same key blade wards 16 as the original key 20, 21. Both the original key 20 and the key blank are then positioned in vises 25-26, which are spaced apart a predetermined distance. The vises 25, 26 include opposed relatively moveable jaws, and may be equipped with a headed bolt 28 or the like for tightening the jaws of the vise together to clamp the keys 20-22 or 21-23 in their respective positions. The vises may be commonly mounted on a carriage diagrammatically illustrated at 30, which maintains the spacing between the vises and which may be affixed to a key cutting machine indicated at 31 in a fashion to simultaneously move the vises both towards and away from a follower 35 in the case of the original key 20, 21 and a key cutter 36 in the case of the key blank 22, 23.

The key blade is provided with a series of grooves, ribs or cuts 32, commonly referred to as bits. These bits, in a tumbler lock, correspond to the individual pins that are to be properly positioned by the bitting 32 of the key when the key blank is seated into the lock cylinder. When the pins are in a properly aligned position with respect to the cylinder-lock body interface, the cylinder can be rotated with respect to the lock body to allow the latch mechanism to unlock. If a individual groove or raised portion 32 is mispositioned with respect to a pin, the pin will not be moved to its unlocked position and the cylinder cannot be rotated in the lock body. It is therefore extremely important that the bits of the key blank 22, 23 be cut specifically to the profile of the bits of the original key.

The positioning of each pin contacting section of the bits along the key blade is determined by the positioning of the pins within the cylinder of a given lock. That positioning is measured from a base point determined by the particular type of lock. Most commonly the base point is either an exterior base point of the cylinder or an internal abutment within the lock. Commonly, when the base point is an exterior face, the key is provided with a shoulder 40, which will abut against that exterior face when the key is fully inserted into the lock, the abutment of the shoulder with the outside face of the cylinder preventing a deeper insertion of the key into the cylinder key slot. Commonly when an internal base point is used, it is used with respect to a contact point of the tip 15 of the key with an interior abutment. Again, contact of the tip with the interior abutment will stop further insertion of the key into the key slot. It will of course be understood by those skilled in the art that many variations on the shoulder or tip base point measurement can be provided, but commonly almost all systems determine the bitting of the key blade along its length by reference to discrete predetermined distances from a base point and the lock and key are provided with features that properly position the key in the key slot so that the bits cut along the length of the key blade to properly align with the pins of the cylinder.

In order for that to happen, the original key and key blank must be positioned in the key cutting machine so that the cuts provided by the key cutter 36 in the key blank will be both to the depth of the bit cut into the original key and properly positioned at the point along the length of the blade as in the original key. This is accomplished in part by utilizing a spacing gage 41, which in FIG. 5 is shown as engaging a shoulder 40 of both the original key and the key blank. When the shoulders 40 are properly engaged by the engagement arms 42 of the spacing gage 41 and the key then clamped in place by the vises 25, 26, the key blank 22 will be spaced longitudinally properly with respect to the original key 20 insofar as the key cutting machine is concerned. The gage 41 is affixed to the cutting machine 31 such that the arms 42 are positioned apart a distance equal to the distance between the follower 35 and the cutter 36. FIG. 6 illustrates a similar alignment being done when the keys in question are tip-position based rather than shoulder-position based. The spacing gage engagement arms 42 will be positioned to engage the tips of the key 21 and the key blank 23.

The depth of insertion of the key blade into the vises may be determined by means such as internal shouldering within the vise jaws which will engage either the non-bitted edge 44 of a single side bitted key or may engage either a non-bitted section 45 of a double side bitted key such as shown in FIG. 2 or may otherwise index with, for example, the warding of the key. To this end it is known to provide jaws having various surface features in their opposing faces to accommodate a plurality of different types of keys.

Because the key cutting machine utilizes a follower 35 or bitted edge engagement face against which the original key is pressed, which follower is spatially aligned with the cutting edge 36 of a cutting wheel or other type of key cutting devise, the same distance as the distance between the vises, as long as the original key 20, 21 and key blank 22, 23 are properly positioned in the respective vises and the jaws clamped tightly about the key, the resultant movement of the original key inwardly and outwardly and laterally along the follower will result in the cutting of a proper bitting of the duplicate key blank.

However, oftentimes either the original key 20, 21 or the key blank 22, 23, or both, will be mispositioned in their respective jaw or the jaw will not be properly tightened, and the key will become mispositioned when engaging either the follower or the key cutting wheel with the result that the cut duplicate will not be a proper duplicate and will need to be discarded after cutting.

FIG. 3 illustrates a key similar to FIG. 1, however instead of relying only upon a shoulder 40 and an edge for positioning in the vise, the side edges of the key are provided with a surface configuration 50, 51, which can be used to properly align the key head in a modified jaw. FIG. 4 represents the same modification of the key of FIG. 2 and again relies upon side surface configurations for alignment. In the keys illustrated in FIGS. 3 and 4, each of the side surface modifications are at the side edges of the keys and consist of indents or notches that are specifically positioned with respect to the longitudinal center line of the key blade and with respect to one another. As shown the notches or indentations may be formed as a partial arc of a circle and preferably include a top wall 53, an inside wall point 54 and a bottom wall portion 55. These are designed to index with cylindrical pins where the pin has a radius substantially identical the radius of at least a portion of the curved walls of the notch or indentation 51. As shown in FIG. 7, the pins 60, 61 project from a face 63 of a jaw 62 of the vise. The pins are spaced apart a distance equal to the spacing of the notches 50, 51 so that in the instance of use of a cylindrical pin and a radiused notch, the axis of the pins will be positioned coaxial with the axis of the radius of the notches, and the distances between the radius's of the notches and of the pins will be equal. Because the notches 50, 51 have the top 53 and bottom walls extending outwardly away from the base of 54 of the notch, once the pins are fully inserted into the notches, the key cannot move with respect to the jaw 62. It will be seen that with the notches 50, 51 positioned with their axis lying in the same plane that the key could be placed on a jaw having correspondingly positioned pins with the working edge or edge to be bitted positioned on opposite sides depending upon whether a top face or a bottom face of the key was engaged against the surface of the jaw having the pins. If it is desired to prevent this from occurring, then positioning the axis of the notches 50, 51 in parallel but spaced planes would assure that the key can only be positioned on the jaw with the working edge of the key positioned to one side. While that single possible position is of importance to a single side bitted key, it is not important to a dual side bitted key as shown in FIGS. 2 and 4, where either of the two possible positions may be acceptable.

FIG. 8 shows the key 64 properly positioned with respect to the pins 60, 61 on the face 63 of the jaw 62. After proper placement of the key, the opposing jaw 65 may be clamped down on the key as shown in FIG. 9. The actual manner in which the jaws are moved together is well known to those of ordinary skill in the art and includes numerous different constructions such as the manual bolt arrangement shown in FIGS. 5 and 6, lever-type arrangements, hydraulic arrangements, pneumatic arrangements, and the like. As shown in FIG. 7 the vise may be equipped with secondary locating pins 70, 71 which may inter-fit with other surface interruptions of the key head, whereby more than two pins may be utilized. Additionally the pins may project a greater or lesser distance from the surface 63 and if desired may project a distance greater than the thickness of the key head and be received in receptacle bores or recesses in the opposed jaw 65 as shown in FIG. 11.

Although FIGS. 3 and 4 and 7-9 illustrate keys and jaw vises which are adapted to project the key blade 14 outwardly from the vise with the key head received inside the vise, as opposed to the side clamping shown in FIGS. 5 and 6, it will be appreciated that the positioning surface interruptions such as the notches 50, 51 and the pins could be positioned so as to have the key blade project along the length of the jaws in the longitudinal direction of the key blade as shown in FIGS. 5 and 6. Although, for example, in FIG. 4 the surface interruptions, notches, recesses, etc. 50, 51 are shown as lying on opposite side edges of the key head, the recesses could be positioned at other points such as 51*a* or 51*c* or could be a partial recess or through-hole such as 51*b*, the recess or through-hole having an ID equal to the OD of the respective alignment pin. To facilitate ease of placement of the keys in proper position in engagement with the respective pins or other surface interruptions, the pins or other surface interruptions could be tapered at their projecting ends, however it is desired that when the jaws are closed in clamping engagement with the key that the surface configurations of the jaw snuggly engage or be in extremely close positional relationship to the associated walls of the surface feature of the keys so that the keys are properly positioned within the bitting tolerance of the locks. It will be appreciated that whenever the final position of the keys with respect to the vise is specified herein as being at a fixed or precise position, that there does exist some degree of tolerance for variations in bit cutting. The degree of possible allowed variance is dependent upon, among other things, the size of the pins used in the lock and whether or not the pin ends at the cylinder-lock body interface have any taper or curvature thereto. Various combinations of the positionings and shaping of the surface configuration will be apparent to those of ordinary skill in the art.

Figure 11:
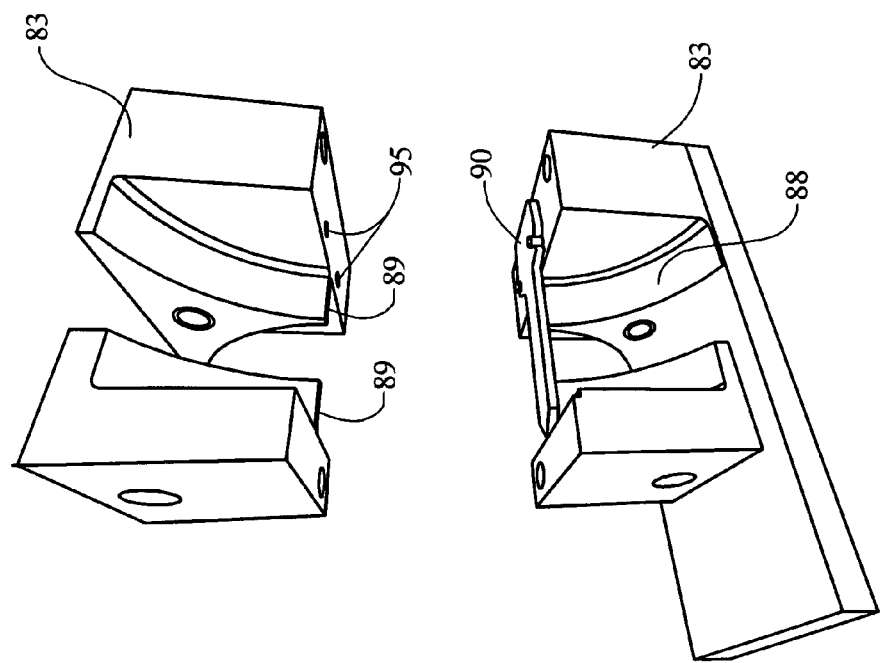
FIG. 11 shows the vise of FIG. 10 with the key in position on the lower jaw assembly.

FIGS. 10-12 illustrate a modified vise in which the upper 80 and lower 81 jaws are formed in two sections, a first section 83 adapted to clamp the head of the key at a second section 84 adapted to clamp the key near its tip. Both sections may be provided with extending opposed faces 85 and 86 which have arcuately shaped sides 87, 89 and 88 which terminate at their tops with relatively narrow extensions extending from the jaw portions 83 and 84. The narrow projections are preferably centralized with respect to the clamped key so that as illustrated in FIGS. 11 and 12, when the key blank 90 is positioned between the vise jaws, the narrowed tops 89 will underlie central portions of the key blank. Since the bitting does not extend to the central portions, the cutting wheel or wheels can move along the length of the key blade forming the bits as necessary with the key blade being clamped at both the head and the tip end and being supported for at least portions of the key blade. Due to the arcuate surfaces 86, 87, 88 the cutting wheel will not engage the jaws as the bits are cut along the bitted edges of the key blade. The upper and lower jaw parts 83, 84 may be moveable towards and away from each other in order to accommodate different lengths of keys and are preferably connected together through aligning mechanisms such as, for example, the guide posts 66 shown in FIGS. 7-9. The lower jaws of the vise may be carried on a mounting 93 which can provide for adjustable positioning of at least one or both of the jaw parts 83, 84 and which can be equipped with suitable securing means for securing the jaw parts in position. It will be obvious to those of ordinary skill in the art that various means of attaching the jaws to the cutting machine may be employed and various mechanisms provided for adjustably positioning the jaws so that the vises are securely attached to the cutting machine and that the respective vises are aligned with one another such that the vise carrying the key blank for presentation to the cutting wheel, wheels or other cutting devise will be properly positioned with respect to the vise carrying the original key.

FIGS. 13 and 14 illustrate the use of alternative styles of surface configuration that can be used for aligning keys. As shown in those figures, a recess or a through-opening 100 may be provided in the key blank 10*a*, 11*a* which has a distinctive shape which will inter-fit with a similarly distinctively shaped projection 101 extending from the face 63*a* of the jaw 62*a*. The projecting pin 101 may extend part way or all the way through the thickness of the key or may extend beyond the key as shown in FIG. 17 where the configuration 101 will mate with an opening in the underside of the jaw 65*a* similar to the openings 95 in the upper jaw portion of FIG. 11 which mate with the projecting pins of the lower jaw portion.

FIG. 15 illustrates various shapes that can be used for the pins including diamond shaped 100, triangular 103, rectangular 104. Obviously many other shapes such as serpentine, crescent, I-shaped, Z-shaped, H-shaped, serpentine etc. can be used, and more than one such projection can be used such that the key may be equipped with more than one recess or opening 100 and the jaw equipped with more than one projection 101. The positioning of the opening 100 may be within the key head itself, in the shank of the key or in unbitted portions of the blade of the key so long as such portions can be clamped within a vise without adversely effecting access of the cutting devise or the follower as the case may be to the working edges.

The use of specifically shaped key recesses, notches or openings which index precisely with complimentary shaped jaw carried projections may also be used to afford an additional level of security against unauthorized duplication. By providing unique key recess or opening shapes and limiting distribution of the jaws equipped with complimentary shaped projections, an additional level of security can be provided. Although the key itself may still be required to have a stop face determining full entry of the key into the lock, such as a shoulder or tip, the key blank can be provided without a correspondingly properly positioned shoulder or tip such that it cannot be properly aligned with an original key, for example by use of the alignment system shown in FIGS. 5 and 6 and therefore can most advantageously be cut only with a machine having a jaw having a correspondingly shaped projection or projections or surface configurations which mate with the corresponding surface configurations of the key. As is known in the art, the stop surface can then be cut into the edge of the key during the cutting operation for the bits. The resultant cut key will then be a duplicate of the original including the stop surface position and shape, however by controlling distribution of jaws and key blanks having the distinctive interfacing surface configurations, an additional level of security can be provided.

Although this invention has been described to certain preferred embodiments, it will be apparent to those skilled in the art that the invention itself can be practiced in many different forms utilizing other designs, devises and approaches.

We claim as our invention:

1. A method of aligning a bitted key and an unbitted key blank for machining a duplicate key having the same bitting as the bitted key which comprises the steps of:

providing a bitted key and an unbitted key blank each having a thickness, a key blade having at least one working edge, and a head having a first face, said bitted key having bitting on the respective at least one working edge, the at least one working edge of said key blank adapted to be cut to provide a bitted edge, providing three-dimensional surface features on the head of the bitted key that match corresponding three-dimensional surface features on the head of the key blank, providing at least two key clamping vises moveably positioned with respect to a follower and a cutter on a key cutting machine with a first of said vises being positionable adjacent the follower and a second of said vises being positionable adjacent the cutter, providing each vise with opposed jaws, providing jaw surface features on a first surface of at least one of the jaws of the key vise adjacent the follower and surface features, matching the jaw surface features, on a first surface of at least one of the jaws of the blank key vise adjacent the cutter, each vise's opposed jaws moveable to clamp a key portion including the respective key's surface features therebetween, wherein the surface features of the vises are complementary to the surface features of the bitted key and key blank, positioning the bitted key and the key blank against the respective first surface of the respective at least one jaw with the respective surface features of each of the bitted key and the key blank engaging the respective surface features of the first surfaces, with the bitted key positioned against the first surface of the jaw of the vise associated with the follower and the key blank positioned against the first surface of the jaw of the vise associated with the cutter, clamping the jaws of the vises against the bitted key and key blank, respectively, while maintaining a mated engagement of the surface features of the bitted key and key blank with the surface features of the jaws to retain the bitted key and key blank in a fixed position relative to the vises, the surface features being configured such that the bitted key and key blank will each have its respective key blade at least one working edge positioned in only one position with respect to its associated vise when the surface features of the bitted key and key blank are engaging the surface features of the respective jaw in mated engagement and the first faces of the bitted key and key blank are in the same orientation.

2. The method of claim 1, wherein the surface features of the bitted key and the key blank comprise configured edge recesses having edge walls, and the jaw's surface features are provided as projections extending above the first surfaces, the projections each having at least a partial outer surface configured to mate against the edge walls of the respective recess and wherein the recesses are positioned with respect to one another and configured such that the bitted key and key blank can be received in not more than two fixed positions relative to the jaws wherein at least two of the projections are in mating engagement with the edges of their corresponding recesses in the bitted key and key blank.

3. The method of claim 2, wherein the projections extend above the respective jaw first surface not greater than a thickness of the portion of the bitted key or key blank positioned between the respective jaws.

4. The method of claim 2, wherein the projections extend above the respective first surface a distance greater than the distance of the portion of the bitted key or key blank received between the respective jaws, and the opposing jaw opposing the first surface in each case is provided with recesses adapted and positioned to receive the respective projections upon clamping and wherein the key edge recesses extend the full thickness of the bitted key and key blank.

5. The method of claim 2, wherein the recesses are provided on opposite side edges of the head of the bitted key and key blank.

* * * * *